(No Model.)

J. A. McCOY & C. SYLVESTER.
Switch Board.

No. 241,812. Patented May 24, 1881.

WITNESSES
L. F. Connor
Arthur Reynolds

INVENTORS
John A. McCoy
and Charles Sylvester
by Crosby Gregory
Attys.

UNITED STATES PATENT OFFICE.

JOHN A. McCOY AND CHARLES SYLVESTER, OF FALL RIVER, MASS.

SWITCH-BOARD.

SPECIFICATION forming part of Letters Patent No. 241,812, dated May 24, 1881.

Application filed December 4, 1880. (No model.)

*To all whom it may concern:*

Be it known that we, JOHN A. McCOY and CHARLES SYLVESTER, of Fall River, Bristol county, and State of Massachusetts, have invented an Improvement in Switch-Boards, of which the following description, in connection with the accompanying drawings, is a specification.

Our invention relates to switch-boards, and is shown embodied in a switch-board for telephone-exchanges having vertical or "line" strips connected with the different subscribers' circuits and horizontal or connecting strips traversing the said line-strips, and each adapted, when connected, as by plugs, with two of the said line-strips to complete the electric circuit from one to the other. The said line-strips are each connected to the ground through continuations normally connected with them, and it is necessary when connecting any two of the said lines to remove the ground therefrom; and our invention consists in pivoting the said line-strips so that they may be movable in the frame-work, they being normally pressed, as by the force of a spring, into contact with grounded continuations, but so placed that when the connecting pieces or plugs are inserted, to form the connection between them and the connecting-strips, the said pieces will turn the said line-strips aside on their pivots, and by this movement break their connection with the grounded continuations.

We do not broadly claim a movable line-strip to be moved out of connection with a grounded continuation by the insertion of the connecting-plug.

Figure 1:
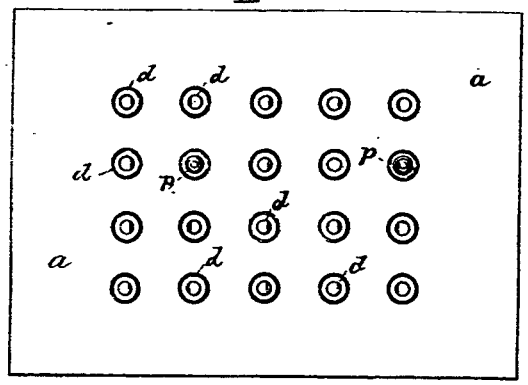
Figure 2:
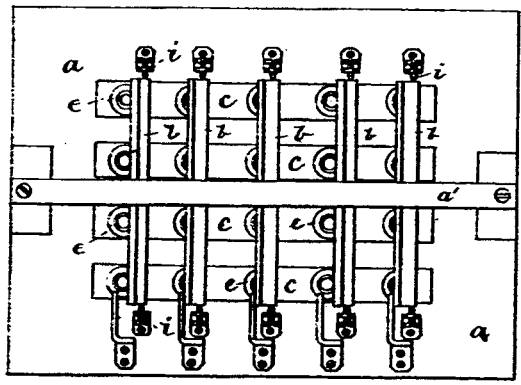
Figure 3:
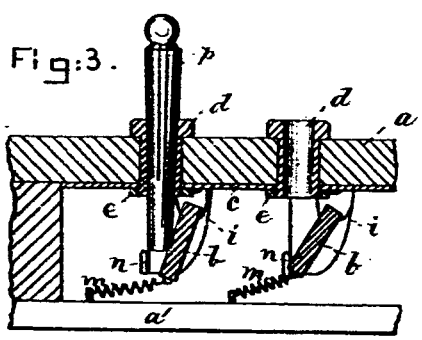
Figure 4:
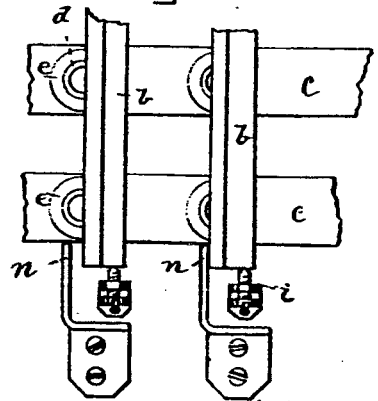

Figure 1 is a front elevation of a switch-board constructed in accordance with our invention; Fig. 2, a rear view thereof; Fig. 3, a horizontal sectional detail on an enlarged scale, and Fig. 4 a detail showing a portion of Fig. 2 enlarged.

The main portion or frame-work $a$ of the switch-board is shown as of insulating material, preferably made up of horizontal strips of wood of different colors, corresponding to the horizontal strips for making the connection between the different vertical or line strips $b$, each forming a portion of a subscriber's circuit.

The horizontal or connecting strips $c$ are placed at the rear of the switch-board $a$, and are each provided with a series of plug-sockets, $d$, extended through to the front face of the switch-board. The said sockets $d$ are screw-threaded at their ends which pass through the connecting-strips $c$, and are held in place by the nuts $e$. All the sockets of each horizontal line are electrically connected together by the strips $c$, but disconnected from the other horizontal lines by the portion of the insulating material $a$ lying between them, and the sockets of the different horizontal strips are placed in line vertically above one another.

The vertical or line strips $b$ are shown as mounted on pivots $i$ at each end, near one edge of the said strips, which are thus free to turn on a longitudinal axis near one edge, the said axis lying at one side of the corresponding vertical row of plug-sockets $d$. The line-strips $b$ are normally held by the springs $m$, pressed against stops $n$, which are otherwise electrically insulated from both the horizontal and vertical strips, but are intended to be connected with the ground after passing through suitable signaling or indicating instruments of any well-known kind. When thus resting against the stops $n$ the vertical strips $b$ are inclined relatively to the axis of the plug-sockets $d$, as shown in Fig. 3, and lie in the path of the plugs $p$ when inserted in the said sockets, so that when one of the said plugs is pushed into its socket its end will engage the vertical strip behind the said socket and turn it on its pivots $i$, overcoming the spring $m$ and disconnecting the said strip from its stop $n$ and electrical conductor that may be connected therewith.

The line-strips $b$ are connected at their upper ends with the different subscribers' circuits, the wires of which may be secured under binding-screws connected with the upper pivot-pieces, $i$, and in their normal condition, when resting against the stops $n$, will be connected thereby to the ground; but upon the insertion of plug $p$ in one of the sockets $d$ the line-strip $b$ lying behind the said socket will be disconnected from the stop $n$ and the ground, and will be connected with the horizontal strip $c$, in which the said socket $d$ lies. By inserting another plug in another socket in the same horizontal line with the first plug, the corresponding line-strip $b$ will be also disconnected from its stop $n$ and the ground and be placed in connection with the line-strip operated upon by the first plug. By withdrawing the plugs the line-strips will be at once automatically restored, by the action of the springs $m$, to their connection, through the stops $n$, with the ground. By pivoting the line-strips in this manner they are readily operated upon by the plugs, and form a good electrical contact therewith.

We claim—

1. In a switch-board, a series of connecting-strips provided with plug-sockets fixed relatively to the frame-work, combined with line-strips mounted on pivots, and ground-stops normally in electrical contact therewith, the said line-strips being located in the path of the plugs when inserted in their sockets, whereby when a plug is inserted to connect a connecting-strip with one of the said line-strips the latter is turned by the said plug on the said pivots out of connection with the said ground-stop, substantially as and for the purpose described.

2. In a switch-board, the combination of the plug-sockets $d$, the plugs $p$, to be inserted therein, with the line-strips $b$ pivoted at their ends, and the springs $m$ and stops $n$ therefor, arranged and to operate substantially as described.

In testimony whereof we have signed our names to this specification in the presence of two subscribing witnesses.

JOHN A. McCOY.
CHARLES SYLVESTER.

Witnesses:
HENRY T. BUFFINGTON,
FRANCIS B. HOOD.